US010110691B2

(12) United States Patent
Rabeela et al.

(10) Patent No.: US 10,110,691 B2
(45) Date of Patent: Oct. 23, 2018

(54) SYSTEMS AND METHODS FOR ENABLING VIRTUAL KEYBOARD-VIDEO-MOUSE FOR EXTERNAL GRAPHICS CONTROLLERS

(71) Applicant: Dell Products L.P., Round Rock, TX (US)

(72) Inventors: Janorious Rabeela, Bangalore (IN); Chandrasekhar Puthillathe, Bangalore (IN); Rajeshkumar Ichchhubhai Patel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 341 days.

(21) Appl. No.: 14/737,842

(22) Filed: Jun. 12, 2015

(65) Prior Publication Data
US 2016/0366239 A1 Dec. 15, 2016

(51) Int. Cl.
H04L 29/08 (2006.01)
G09G 5/36 (2006.01)
G06F 13/42 (2006.01)
G09G 5/393 (2006.01)
G09G 5/00 (2006.01)

(52) U.S. Cl.
CPC ...... H04L 67/2819 (2013.01); G06F 13/4221 (2013.01); G09G 5/001 (2013.01); G09G 5/363 (2013.01); G09G 5/393 (2013.01); H04L 67/02 (2013.01); G09G 2370/02 (2013.01); G09G 2370/24 (2013.01)

(58) Field of Classification Search
CPC .... G09G 2370/24; G09G 5/001; G09G 5/363; G09G 5/393; G09G 2370/02; H04L 67/2819; H04L 67/02; G06F 13/4221
See application file for complete search history.

(56) References Cited

U.S. PATENT DOCUMENTS

| 8,904,079 | B2* | 12/2014 | Chang | G06F 13/20 710/313 |
| 9,384,525 | B2 | 7/2016 | Lambert et al. | |
| 9,508,108 | B1* | 11/2016 | Tavares | G06T 1/00 |
| 9,600,295 | B2 | 3/2017 | Liu | |
| 2005/0262269 | A1* | 11/2005 | Pike | H04L 12/4633 710/1 |
| 2009/0083760 | A1* | 3/2009 | Slaight | G06F 13/4022 719/313 |
| 2009/0144530 | A1* | 6/2009 | Mondshine | G06F 9/4406 713/1 |

(Continued)

Primary Examiner — Arvin Eskandarnia
Assistant Examiner — Chhian Ling
(74) Attorney, Agent, or Firm — Jackson Walker L.L.P.

(57) ABSTRACT

In accordance with embodiments of the present disclosure, an information handling system may include a processor and a management controller communicatively coupled to the processor and configured to provide out-of-band management of the information handling system. The management controller may be further configured to receive video data from an external graphics controller external to a motherboard upon which the processor resides, wherein each of the external graphics controller and the management controller are endpoints of a root complex instantiated on the processor and forward the video data to a remote management console communicatively coupled to the management controller via a network.

14 Claims, 2 Drawing Sheets

(56) References Cited

U.S. PATENT DOCUMENTS

| | | | |
|---|---|---|---|
| 2009/0164684 A1* | 6/2009 | Atherton | G06F 13/387 710/300 |
| 2009/0164690 A1* | 6/2009 | Slaight | G06F 13/385 710/306 |
| 2009/0172241 A1* | 7/2009 | Chen | G06F 1/26 710/313 |
| 2010/0281094 A1* | 11/2010 | Holt | H04L 41/0226 709/201 |
| 2011/0138082 A1* | 6/2011 | Khatri | G06F 13/24 710/8 |
| 2011/0161482 A1* | 6/2011 | Bonola | G06F 9/5077 709/223 |
| 2012/0154375 A1* | 6/2012 | Zhang | G06F 9/4411 345/419 |
| 2012/0173755 A1* | 7/2012 | Margulis | G06F 3/14 709/231 |
| 2014/0013388 A1* | 1/2014 | Chandrasekhar | G06F 21/70 726/3 |
| 2014/0208442 A1* | 7/2014 | Mooring | G06F 9/45533 726/30 |
| 2015/0097843 A1* | 4/2015 | Lambert | G06F 9/4401 345/503 |
| 2016/0026602 A1* | 1/2016 | Narayana | G06F 13/4221 710/106 |
| 2016/0196147 A1* | 7/2016 | Liu | G06F 9/4411 713/1 |

* cited by examiner

SYSTEMS AND METHODS FOR ENABLING VIRTUAL KEYBOARD-VIDEO-MOUSE FOR EXTERNAL GRAPHICS CONTROLLERS

TECHNICAL FIELD

The present disclosure relates in general to information handling systems, and more particularly to methods and systems for enabling virtual keyboard-virtual-mouse functionality for an information handling system having an external graphics controller.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a management controller for providing out-of-band management facilities for management of the information handling system. Such management may be made by the management controller even if the information handling system is powered off or powered to a standby state, as a management controller may include an out-of-band network interface separate from and physically isolated from an in-band network interface of the information handling system. Such management controllers may include or may be an integral part of a baseboard management controller (BMC), a remote access controller (e.g., a Dell Remote Access Controller of Integrated Dell Remote Access Controller), an enclosure controller, or a chassis management controller (CMC).

Often, a management controller may interface with a remote management console coupled to the management controller via the out-of-band network interface, such that the remote console may execute a virtual keyboard-video-mouse (KVM) interface which replicates video display data of a host system to a display of the remote console and/or receives and transmits input (e.g., via a keyboard, mouse, and/or other input device of the remote console) from the remote console to the host system in order to manipulate the host system. However, in existing approaches, a host system typically uses an embedded graphics controller disposed on the same printed circuit board (e.g., motherboard) of the management controller in order to render its video display data, and such existing approaches may render management controllers unable to use external graphics controllers (e.g., graphics controllers coupled via an PCI port) to render video display data.

SUMMARY

In accordance with the teachings of the present disclosure, the disadvantages and problems associated with existing approaches to enabling virtual keyboard-video-mouse capability in an information handling system comprising an external graphics controller may be reduced or eliminated.

In accordance with embodiments of the present disclosure, an information handling system may include a processor and a management controller communicatively coupled to the processor and configured to provide out-of-band management of the information handling system. The management controller may be further configured to receive video data from an external graphics controller external to a motherboard upon which the processor resides, wherein each of the external graphics controller and the management controller are endpoints of a root complex instantiated on the processor and forward the video data to a remote management console communicatively coupled to the management controller via a network.

In accordance with these and other embodiments of the present disclosure, a method may include, in an information handling system comprising a management controller communicatively coupled to a processor of the information handling system and configured to provide out-of-band management of the information handling system: receiving video data at the management controller from an external graphics controller external to a motherboard upon which the processor resides, wherein each of the external graphics controller and the management controller are endpoints of a root complex instantiated on the processor; and forwarding the video data from the management controller to a remote management console communicatively coupled to the management controller via a network.

In accordance with these and other embodiments of the present disclosure, an article of manufacture may include a non-transitory computer-readable medium and computer-executable instructions carried on the computer-readable medium. The instructions may be readable by a processor, the instructions, when read and executed, for causing the processor to, in an information handling system comprising a management controller communicatively coupled to a processor of the information handling system and configured to provide out-of-band management of the information handling system: receive video data at the management controller from an external graphics controller external to a motherboard upon which the processor resides, wherein each of the external graphics controller and the management controller are endpoints of a root complex instantiated on the processor; and forwarding the video data from the management controller to a remote management console communicatively coupled to the management controller via a network.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
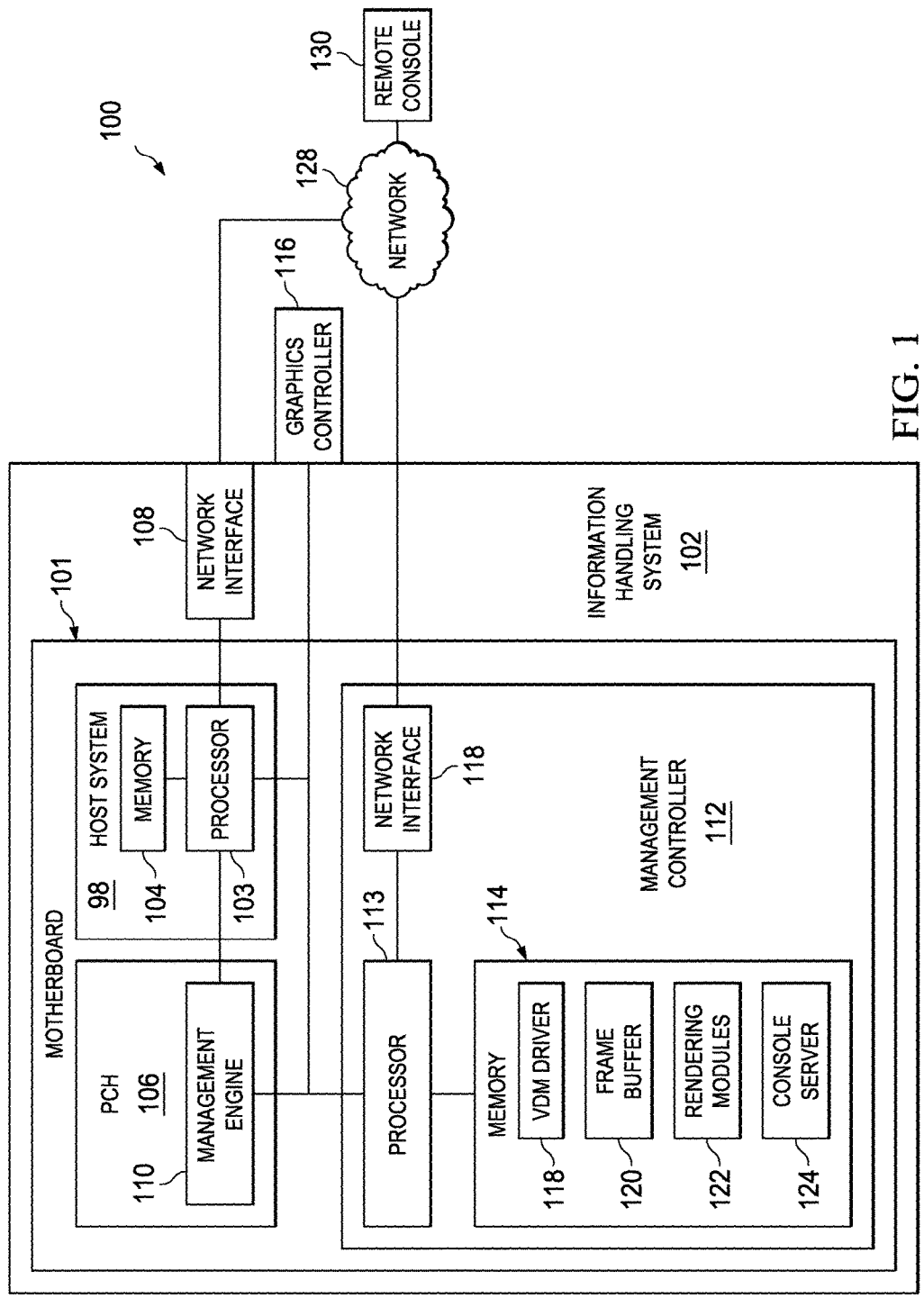
FIG. 1 illustrates a block diagram of an example information handling system, in accordance with embodiments of the present disclosure.
Figure 2:
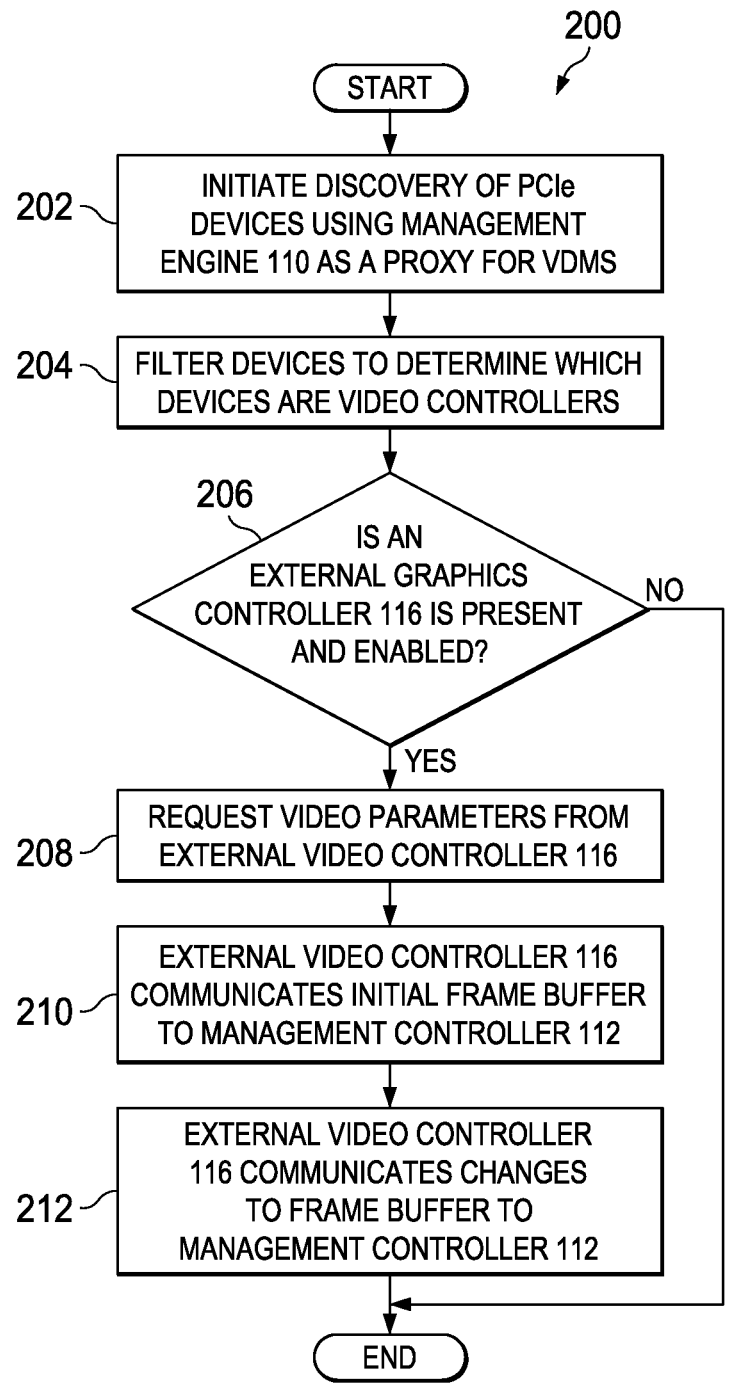
FIG. 2 illustrates a flow chart of an example method for enabling virtual keyboard-video-mouse in an information handling system comprising an external graphics controller, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of a system 100 for remote management of an information handling system 102. As shown in FIG. 1, such system 100 may include information handling system 102, a network 128, and a remote console 130.

In some embodiments, information handling system 102 may be a personal computer. In some embodiments, information handling system 102 may comprise or be an integral part of a server. In other embodiments, information handling system 102 may be a portable information handling system (e.g., a laptop, notebook, tablet, handheld, smart phone, personal digital assistant, etc.). As depicted in FIG. 1, information handling system 102 may include a motherboard 101, a network interface 108 communicatively coupled to a processor 103 of motherboard 101, and an external graphics controller 116 communicatively coupled to processor 103.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include processor 103, a memory 104 communicatively coupled to processor 103, a platform controller hub (PCH) 106 communicatively coupled to processor 103, and a management controller 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off. Although memory 104 is depicted in FIG. 1 as integral to motherboard 101, in some embodiments, all or a portion of memory 104 may reside external to motherboard 101. In operation, processor 103 and memory 104 may comprise at least a portion of a host system 98.

PCH 106 may be any system, device, or apparatus configured to control certain data paths (e.g., data flow between processor 103, memory 104, and peripherals) and support certain functions of processor 103. A PCH 106 may also be known as a "chipset" of an information handling system 102. One such function may include management engine 110. Management engine 110 may comprise hardware and/or firmware that enables remote out-of-band management for information handling system 102 in order to monitor, maintain, update, upgrade, and/or repair information handling system 102. In some embodiments, management engine 110 may include hardware and firmware compliant with Intel's Active Management Technology.

Management controller 112 may be configured to provide out-of-band management facilities for management of information handling system 102. Such management may be made by management controller 112 even if information handling system 102 is powered off or powered to a standby state. Management controller 112 may include a processor 113, memory 114, and an out-of-band network interface 118 separate from and physically isolated from in-band network interface 108. In certain embodiments, management controller 112 may include or may be an integral part of a baseboard management controller (BMC), a remote access controller (e.g., a Dell Remote Access Controller of Integrated Dell Remote Access Controller), or an enclosure controller. In other embodiments, management controller 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off. As shown in FIG. 1, memory 114 may have stored thereon a vendor-defined message (VDM) driver 118, a frame buffer 120, one or more rendering modules 122, and a console server 124.

A VDM driver 118 may comprise any program of instructions configured to, when read and executed by processor 113, provide an interface between console server 124 and host system 98 in order to process VDMs communicated from management controller 112 to other devices of information handling system 102.

Frame buffer 120 may comprise a portion of memory 114 comprising a bitmap that may be driven to a video display from a memory buffer containing a complete frame of video data. For example, the information in frame buffer 120 typically may comprise color values for every pixel to be displayed on a display device.

A rendering module 122 may comprise any program of instructions configured to, when read and executed by processor 113, perform operations to process and/or render video data. Such operations may include, without limitation, computations of differences between successive video frames, video compression, and/or other tasks.

Console server 124 may comprise any program of instructions configured to, when read and executed by processor 113, provide a network service to remote console 130 to facilitate remote management of information handling system 102 by remote console 130.

Network interface 118 may comprise any suitable system, apparatus, or device operable to serve as an interface between management controller 112, network 128, and/or one or more other information handling systems. Network interface 118 may enable management controller 112 to communicate using any suitable transmission protocol and/or standard. In these and other embodiments, network interface 118 may comprise a network interface card, or "NIC."

Network interface 108 may comprise any suitable system, apparatus, or device operable to serve as an interface between information handling system 102, network 128, and/or and one or more other information handling systems. Network interface 108 may enable information handling system 102 to communicate using any suitable transmission protocol and/or standard. In these and other embodiments, network interface 108 may comprise a network interface card, or "NIC."

External graphics controller 116 may be communicatively coupled to host system 98 and may include any system, device, or apparatus configured to rapidly manipulate and alter memory to accelerate the creation of images in a frame buffer intended for output to a display. As shown in FIG. 1, external graphics controller 116 may reside external to motherboard 101. For example, in some embodiments, graphics controller 116 may couple to an external port facing externally to an enclosure for information handling system 102.

PCH 106, management controller 112, and graphics controller 116 may be communicatively coupled to host processor 98 via any suitable communications interface or bus. For example, in some embodiments, PCH 106, management controller 112, and graphics controller 116 may be communicatively coupled to host system 98 via one or more Peripheral Component Interconnect Express (PCIe) buses.

Network 128 may be a network and/or fabric configured to couple information handling system 102, remote console 130, and/or one or more other information handling systems to one another. In these and other embodiments, network 128 may include a communication infrastructure, which provides physical connections, and a management layer, which organizes the physical connections and information handling systems communicatively coupled to network 128. Network 128 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 128 may transmit data via wireless transmissions and/or wireline transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 128 and its various components may be implemented using hardware, software, or any combination thereof.

Remote console 130 may comprise any information handling system including requisite hardware, software, and/or firmware for interfacing with console server 124 via network interface 118 in order to facilitate remote management of information handling system 102 by remote console 130. In some embodiments, such remote management may be in accordance with Intelligent Platform Management Interface (IPMI) and/or another suitable interface or standard.

In operation, host system 98 may operate as a root complex (e.g., a PCIe root complex) for communication among various endpoints (e.g., PCIe endpoints) within or associated with information handling system 102. Such endpoints may include management controller 112 and external graphics controller 116. In addition, management engine 110 may serve as a proxy for routing data to different endpoints coupled to the root complex of host system 98. To facilitate virtual KVM functionality, management controller 112 may exchange instructions and data via VDMs to and/or from all VDM-capable devices coupled to the root complex. Accordingly, references herein to communication between management controller 112 and graphics controller 116 may refer to communication via VDMs.

FIG. 2 illustrates a flow chart of an example method 200 for enabling virtual KVM in information handling system 102, in accordance with embodiments of the present disclosure. According to some embodiments, method 200 may begin at block 202. As noted above, teachings of the present disclosure may be implemented in a variety of configurations of information handling system 102. As such, the preferred initialization point for method 200 and the order of the steps comprising method 200 may depend on the implementation chosen.

At step 202, processor 113, executing management firmware of management controller 112 including console server 124 and VDM driver 118, may initiate discovery of PCIe devices, using management engine 110 as a proxy for VDMs. Such discovery may initiate following enumeration of PCIe devices by a basic input/output system (BIOS) of information handling system 102 during a boot of information handling system 102 and/or following a "hot plug" of one or more PCIe devices during runtime.

At step 204, following discovery processor 113 may filter the devices (e.g., by PCIe class code) to determine which devices are video controllers. At step 206, processor 113 may determine if an external graphics controller 116 is present and enabled. If an external graphics controller 116 is present and enabled, method 200 may proceed to step 208. Otherwise, method 200 may end.

At step 208, processor 113 may request (e.g., via VDMs) video parameters (e.g., screen resolution, color depth, etc.) from external graphics controller 116. Additionally, processor 113 may register management controller 112 to external graphics controller 116 so that graphics controller 116 forwards converted frame buffers to management controller 112.

At step 210, external graphics controller 116 may communicate to management controller 112 an initial frame buffer. Such frame buffer may be rendered by external graphics controller 116 in response to screen buffers received by external graphics controller 116 from a host operating system executing on host system 98. After receipt, such frame buffer may be stored as frame buffer 120 in memory 114. Management controller 112 may communicate data of frame buffer 120 to remote console 130 for rendering at remote console 130.

At step 212, changes or deltas to the frame buffer may be communicated from external graphics controller 116 at management controller 112, and step 212 may repeat until no video data remains to be communicated to remote console 130.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using system 200 or any other system operable to implement method 200. In certain embodiments, method 200 may be implemented partially or fully in software and/or firmware embodied in computer-readable media.

Although method 200 contemplates a "push" mechanism by which external graphics controller 116 communicates video data to management controller 112 as it is processed by external graphics controller 116, in some embodiments communication between external graphics controller 116 and management controller 112 may be undertaken in a request-response mechanism in which video data is communicated by external graphics controller 116 only when requested by management controller 112. This may be desirable in situations in which management controller 112 may not require all frames from external graphics controller 116.

In embodiments in which video compression is desirable, rendering modules 122 may be executed by processor 113 to compress video data before communication to remote console 130.

Furthermore, in some embodiments, in response to a video resolution change by an operating system executing on host system 98, external graphics controller 116 may communicate a message to management controller 112 indicating the change in resolution. Management controller 112 may respond by dropping existing frame buffers and re-requesting new frame buffers in a manner identical or similar to that described above with respect to method 200.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
 a processor;
 a management controller communicatively coupled to the processor and configured to provide out-of-band management of the information handling system and further configured to;
  request a set of video parameters from an external graphics controller external to a motherboard upon which the processor resides, wherein the request is made via vendor-defined messages, and wherein the external graphics controller and the management controller are endpoints of a root complex instantiated on the processor;
  receive, via vendor-defined messages, video data from the external graphics controller, wherein the received video data corresponds to the requested set of video parameters;
  forward the video data to a remote management console communicatively coupled to the management controller via a network, wherein the forwarded video data is usable in a virtual keyboard-video-mouse (KVM) interface at the remote management console to control the information handling system; and
 a management engine communicatively coupled to the processor and configured to operate as a proxy for the video data received at the management controller from the external graphics controller via the vendor-defined messages.

2. The information handling system of claim 1, wherein the management controller is configured to receive video data from the external graphics controller in response to a message communicated from the management controller to the external graphics controller.

3. The information handling system of claim 1, wherein the management controller and the external graphics controller are configured to communicate via a Peripheral Component Interconnect Express bus.

4. The information handling system of claim 1, wherein receiving video data from the external graphics controller comprises:
 receiving an initial frame buffer from the external graphics controller;
 storing the initial frame buffer in memory;
 receiving changes to the initial frame buffer; and
 storing the changes to memory.

5. A method comprising, in an information handling system comprising a management controller communicatively coupled to a processor of the information handling system and configured to provide out-of-band management of the information handling system:
 requesting a set of video parameters from an external graphics controller external to a motherboard upon which the processor resides, wherein the request is made via vendor-defined messages, and wherein the external graphics controller and the management controller are endpoints of a root complex instantiated on the processor;
 receiving, via vendor-defined messages, video data at the management controller from the external graphics controller, wherein the received video data corresponds to the requested set of video parameters;
 forwarding the video data from the management controller to a remote management console communicatively coupled to the management controller via a network, wherein the forwarded video data is usable in a virtual keyboard-video-mouse (KVM) interface at the remote management console to control the information handling system; and
 configuring a management engine communicatively coupled to the processor to operate as a proxy for the video data received at the management controller from the external graphics controller via the vendor-defined messages.

6. The method of claim 5, further comprising receiving the video data from the external graphics controller in response to a message communicated from the management controller to the external graphics controller.

7. The method of claim 5, further comprising communicating between the management controller and the external graphics controller via a Peripheral Component Interconnect Express bus.

8. The method of claim 5, wherein receiving video data from the external graphics controller comprises:
 receiving an initial frame buffer from the external graphics controller;
 storing the initial frame buffer in memory;
 receiving changes to the initial frame buffer; and
 storing the changes to memory.

9. An article of manufacture comprising:
 a non-transitory computer-readable medium; and
 computer-executable instructions carried on the computer-readable medium, the instructions readable by an information handling system comprising a management controller communicatively coupled to a processor of the information handling system and configured to provide out-of-band management of the information handling system, the instructions being configured to cause the information handling system to:
  request a set of video parameters from an external graphics controller external to a motherboard upon which the processor resides, wherein the request is made via vendor-defined messages, and wherein the external graphics controller and the management controller are endpoints of a root complex instantiated on the processor;
  receive, via vendor-defined messages, video data at the management controller from the external graphics controller, wherein the received video data corresponds to the requested set of video parameters;
  forward the video data from the management controller to a remote management console communicatively coupled to the management controller via a network, wherein the forwarded video data is usable in a virtual keyboard-video-mouse (KVM) interface at the remote management console to control the information handling system; and
  configure a management engine communicatively coupled to the processor to operate as a proxy for the video data received at the management controller from the external graphics controller via the vendor-defined messages.

10. The article of claim 9, the instructions for further causing the processor to receive the video data from the external graphics controller in response to a message communicated from the management controller to the external graphics controller.

11. The article of claim 9, the instructions for further causing the processor to communicate between the management controller and the external graphics controller via a Peripheral Component Interconnect Express bus.

12. The article of claim 9, wherein receiving video data from the external graphics controller comprises:

receiving an initial frame buffer from the external graphics controller;
storing the initial frame buffer in memory;
receiving changes to the initial frame buffer; and
storing the changes to memory.

13. The article of claim 9, wherein the set of video parameters comprises a resolution.

14. The article of claim 9, wherein the set of video parameters comprises a color depth.

\* \* \* \* \*